United States Patent [19]
Fuller et al.

[11] 3,959,448
[45] May 25, 1976

[54] PROCESS FOR THE MANUFACTURE OF CARBON FIBERS

[75] Inventors: Robert John Fuller, Great Bookham; William Redvers Ladner, Leatherhead; Ernest Pritchard, Woking, all of England

[73] Assignee: Coal Industry (Patents) Limited, London, England

[22] Filed: Feb. 4, 1975

[21] Appl. No.: 546,918

Related U.S. Application Data

[63] Continuation of Ser. No. 347,633, April 4, 1973, abandoned, which is a continuation of Ser. No. 67,600, Aug. 27, 1970, abandoned.

[30] Foreign Application Priority Data

Aug. 27, 1969 United Kingdom............... 42675/69

[52] U.S. Cl................................. 423/447; 264/29
[51] Int. Cl.². ........................................ C01B 31/07
[58] Field of Search ............. 423/447; 264/29, 176; 208/8

[56] References Cited
UNITED STATES PATENTS

| | | | |
|---|---|---|---|
| 1,925,005 | 8/1933 | Rose et al. | 208/8 |
| 3,240,566 | 3/1966 | Bullough et al. | 208/8 X |
| 3,392,216 | 7/1968 | Otani | 423/447 X |
| 3,595,946 | 7/1971 | Joo et al. | 264/29 |
| 3,629,379 | 12/1971 | Otani | 423/447 X |

*Primary Examiner*—Edward J. Meros
*Attorney, Agent, or Firm*—Stevens, Davis, Miller & Mosher

[57] ABSTRACT

The invention comprises the use of a solution or extract of coal as a carbonaceous material to produce carbon fibers, filaments or films in a process comprising extruding or spinning the carbonaceous material to form a fiber, filament or film, oxidizing the spun or extruded carbonaceous material to stabilize it to further heat treatment, and carbonizing the stabilized carbonaceous material. Solutions or extracts of coal may be made by treating the coal with a high boiling aromatic solvent, for example anthracene oil or phenanthrene, at an elevated temperature, for example 400°C.

6 Claims, No Drawings

PROCESS FOR THE MANUFACTURE OF CARBON FIBERS

This is a continuation of application Ser. No. 347,633 filed Apr. 4, 1973, now abandoned which in turn is a continuation of application Ser. No. 67,600, filed Aug. 27, 1970, now abandoned.

OBJECTS OF THE INVENTION

It is an object of the present invention to provide a process for the production of carbon fibres whereby said carbon fibres may be produced in a simple manner.

It is a further object of the invention to provide a process whereby carbon fibres, filaments and films may be produced from a readily available starting material.

It is a further object of the present invention to provide a process for the manufacture of carbon fibres, filaments and films whereby the carbon fibres, filaments and films may be manufactured without prolonged oxidation treatment.

It is a further object of the present invention to provide a process for the manufacture of carbon fibres, filaments and films whereby the carbon fibres, filaments or films may be manufactured without the necessity of employing ozone or like oxidising agents if a relatively short oxidation stage is required.

It is a further object of the present invention to provide a process for the manufacture of carbon fibres, filaments or films whereby the carbon fibres, filaments or films may be manufactured without the necessity of employing a prolonged heat treatment stage.

It is a further object of the present invention to provide a process for the manufacture of carbon fibres, filaments or films whereby the carbon fibres, filaments or films nay be manufactured with a high throughput in the heat treatment stage.

Other and further objects of the present invention will be clear to those skilled in the art from the following description.

BACKGROUND TO THE INVENTION

Carbon fibres, filaments and films, when of sufficient strength, can have many industrial applications and can be applied, for example, to materials of construction, such as composites, for the strengthening thereof.

It has been proposed to produce carbon fibres from coal-tar pitches. The proposed method comprises extruding or spinning the coal-tar pitches to form a fibre, filament or film, oxidising the fibre, filament or film to stabilise it to heat treatment, and carbonising the stabilised fibre, filament or film. Coal-tar pitches are formed by the destructive distillation of coal. They are relatively low molecular weight substances and have a relatively low melting or softening point. Because the oxidation treatment must be carried out at or below the melting or softening point of the pitch, the treatment requires to be carried out over a relatively long period of time, for example 24 hours. Ozone is required if good results are to be obtained. This is disadvantageous in the manufacture of such carbon fibres, filaments or films on a large scale. Such pitches are relatively mobile and are difficult to extrude or spin, because the filaments, fibres or films adhere to one another or to processing equipment. The carbonisation requires to be carried out employing a low rate of heating, and prolonged high temperature treatment. Heating may take several hours to reach the desired temperature at which the fibre, filament or film is treated for several, for example 24, further hours. This makes a substantial contribution to the cost of the carbon fibre, filament or film, and it would be of considerable economic advantage to be able to employ high rates of heating and short high temperature treatment times.

In order to overcome some of the foregoing disadvantages, it has further been proposed to treat such pitches in such a manner that their molecular weight and carbon content increases, so that they may more readily be extruded or spun and be rendered infusible. The fibres, filaments or films extruded or spun from such pitches still require to be treated for a relatively long time, normally a matter of hours, with ozone, in order to render them stable and infusible so as to enable carbonisation to take place without melting of the fibre. A further disadvantage of the employment of such coal-tar pitches is that they are formed in only a small yield based on the coal, as by-products of carbonisation processes. The use of such treated pitches does not appear substantially, if at all, to diminish the heat treatment time.

According to the present invention there is provided a process for producing fibres, filaments or films consisting of carbon which comprises spinning or extruding a solution or extract of coal to form a fibre, filament or film, oxidising the spun or extruded fibre, filament or film to form a fibre, filament or film stabilised to heat treatment and carbonising the stabilised fibre, filament or film.

By "solution or extract of coal" it is meant to include those products formed by the treatment of coals with high boiling aromatic solvents, but other solvents, for example chloroform and pyridine, may also be employed, By "high boiling aromatic solvents" it is meant to include those solvents boiling above about 200°C and which contain at least one aromatic ring. Such solvents are known, in general, to dissolve at least a portion of the aromatic matter from coal. Suitable solvents include polynuclear aromatic hydrocarbons, for example phenanthrene, although it will not be normal to employ pure compounds as solvents for economic reasons. Mixtures of high boiling hydrocarbons formed from coal are particularly suitable, for example anthracene oils. Hydrogenated polycyclic hydrocarbons may be used but these normally react with the coal in a well-known manner and hydrogenate the coal, forming aromatic hydrocarbons; for example, tetralin is dehydrogenated to naphthalene. This is subject to the economic disadvantage that the solvent cannot be recovered, but the solution or extract may be employed. It may sometimes be convenient to form the solution or extract of coal by so treating the coal in the presence of hydrogen gas which reacts with the coal. Any solvent may, in principle, be employed but low boiling point solvents may evaporate during the extrusion or spinning or during the heat treatment, or both, of the fibres, filaments or films. This has, inter alia, the disadvantage that pits or voids may be formed in the fibre, filament or film so extruded or spun which may weaken the fibre, filament or film. In the case where a low boiling point solvent has been employed to produce a solution or extract of coal, it is preferred to employ in the process of this invention substantially solvent-free extract of coal produced from such a solution or extract.

The term solution or extract of coal is not intended to be limited to products formed by the liquid phase dissolution or extraction of coal but to include those products formed by treating coal, or a solution or extract thereof, with a solvent in the gaseous phase, at either above or below the critical pressure and temperature of the gaseous solvent, and condensing the portion of the coal dissolved or entrained in the gaseous solvent. Such solvents are not limited to those that are liquid at ambient conditions but may include, for example, ethane and other gases.

Any coal may be, in principle, employed to form the solution or extract. It is, however, known that coals having a high carbon content, for example above about 90%, are difficult to dissolve or extract. Accordingly it is preferred to employ a coal other than those of National Coal Board coal rank code 100 series and 200 series. Desirably the coal has a carbon content of between 80 and 90%, and preferably between 82 and 86%. The term "coal" as used herein is intended to include materials that are of a coal-like nature and which contain dissolvable material, for example lignite. Percentages of carbon in the coal are on a dry mineral-matter free basis, by weight.

The coal may be dissolved or extracted at an elevated temperature, desirably between 350° and 450°C. A preferred temperature is about 400°C. The normal chemical engineering considerations would be applicable to this dissolution or extraction. For example the higher the temperature, the more rapidly the dissolution or extraction takes place, but the more undesirable by-products, particularly coke, are formed. The dissolution or extraction can take place in any suitable manner. One method is by digestion of the coal with the solvent, the solvent being in excess, at the elevated temperature, and then removing the solid material that is not dissolved from the solution. An alternative method is by extraction, in a Soxhlet type of apparatus. The solution or extract of coal should be filtered to remove mineral matter, which may give rise to weaknesses in the extruded or spun fibre, filament or film. Excess, or all, the solvent can then be removed, for example by distillation at temperatures about 300°C at a pressure of about 10 Torr.

The solution or extract of coal is then spun or extruded at a suitable temperature. This temperature is just above the melting or softening point of the solution or extract, and can easily be determined by experiment. The melting or softening point will depend upon the amount of solvent remaining in the extract or solution. This is conveniently between 60 and 40%, and preferably about 50%, by weight, in the total solution or extract if a high boiling aromatic solvent is employed. The most suitable method of spinning or extruding is melt spinning at a temperature of about 150° to 250°C but it is often convenient to employ a temperature of up to about 300°C. The fibre, filament or film so spun or extruded is preferably drawn or stretched during spinning or extrusion in order to form the fibre, filament or film to be heat treated.

The spun or extruded fibre, filament or film is then oxidised in a suitable manner, for example in an oxidising atmosphere, to stabilise the fibre, filament or film to heat treatment, rendering it infusible. This oxidation treatment is carried out at a temperature below that at which the fibre, filament or film melts or softens. The temperature at which the fibre, filament or film melts or softens is not necessarily that at which the solution or extract of coal used to form the fibre, filament or film melts or softens. For example, a certain amount of solvent may evaporate during the extrusion or spinning, thereby raising the melting or softening point of the fibre, filament or film above that of the solution or extract of coal used to form the fibre, filament or film. Furthermore, the fibre, filament or film may be oxidised to a certain extent during spinning or extrusion. If the fibre, filament or film is heated from a relatively low temperature, say from below 100°C, in an oxidising atmosphere, it may be sufficiently stabilised to heat treatment, by reaction at that relatively low temperature, to be able to be heated to a higher temperature above the softening point of the solution or extract of coal used to form the fibre, filament or film to enable it to be oxidised further to stabilise it to further heat treatment, at a higher temperature still, so that it can be carbonised. Suitable oxidising atmosphere desirably contain molecular oxygen. Oxygen is preferred as the oxidising atmosphere, but air may be employed. The molecular oxygen may be $O_2$ or $O_3$. The oxidation should take place for at least sufficient time to stabilise the fibre, filament or film to heat treatment. This time may be about 5 minutes, if, for example, the oxidation takes place in oxygen at about 270°C. The oxidation is carried out, desirably, when the fibre, filament or film is under at least sufficient tension to maintain it straight during the oxidation. If it is not maintained under such tension the fibre, filament or film may curl. Such curled fibres, filaments or films are not desired for certain commercial uses.

The stabilised fibre, filament or film is then heated to carbonise it. This heating is conventionally to a temperature within the range of 600° to 3,000°C in an inert atmosphere, and a preferred range is 900° to 1,200°C. A preferred inert atmosphere is oxygen-free nitrogen. However, the initial part of the heat treatment for carbonisation, particularly up to about 400°C, may be carried out in an oxygen containing atmosphere. The temperature should not be raised too rapidly since the solvent may evaporate before being carbonised and form pits either on the surface or in the interior of the fibre, filament or film, which may weaken the fibre, filament or film. A rate of increase of temperature of 100°C/min. may often be employed but it is generally convenient to employ rates of increase of temperature of up to 50°C/min. A preferred rate of increase of temperature is in the range 25°C/min. to 30°C/min. This high rate of heating in order to effect carbonisation of the stabilised fibre, filament or film and low total heating time is a considerable advantage since a substantial part of the cost of the fibres is the cost of the heat treatment stages, both the stabilisation and carbonisation. The rapid treatment during the carbonisation that can be obtained by the process of the present invention enables a greater throughput to be obtained from a given apparatus. If desired the carbonisation of the fibre, filament or film may follow immediately after the stabilisation thereof by the oxidation treatment, without cooling. Thus the spun or extruded fibre, filament or film may be heated in a suitable furnace using a single rate of increase of temperature, for example 25°C/min., the atmosphere for the initial portion of the heating schedule being oxidising, and that in the later portion being inert. Alternatively, the rate of increase of temperature can be lower during the initial portion of the heating schedule, and increased during the later portion of the heating schedule.

By means of the process of the present invention, fibres may be produced that are stronger than those that can be manufactured from coal-tar pitch, or other pitches, by the previously proposed processes hereinbefore described. The fibres are not, in general, as strong as those that can be produced from addition polymers, for example acrylonitrile polymers. They are, however, cheaper to manufacture and may find uses where the higher strength and modulus of the fibres produced from acrylonitrile polymers is not required.

Carbon fibres made by the process of the invention have been shown to have tensile strengths up to $12 \times 10^6$ g/cm$^2$ and moduli of elasticity up to $12 \times 10^8$ g/cm$^2$, while the diameter of the carbon fibres may be as low as 5 $\mu$m.

Fibres, filaments and films prepared by the process of the present invention may be employed embedded in resins elastomers and metals. These composites have good physical, thermal and electrical properties. Suitable resins include phenol/formaldehyde condensation resins. The resin may be carbonised to form a strengthened carbon artefact, for use, for example as electrodes. The fibres, filaments and films may also be employed as heat insulation material, as a filler for electrically conductive paints and as electrically conductive material in, for example, heating elements and resistors.

The invention will now be illustrated in the following, non-limitative, examples, which are to be considered as being typical but which may be modified in any manner as hereinbefore referred to or as will be clear to those skilled in the art:

EXAMPLE 1

A coal extract was produced by treating a coal of 84% carbon content with anthracene oil at 400°C. The extract was heated to a temperature of 230°C and was extruded at this temperature and drawn at a draw rate of 100 meters/min. to produce a raw continuous fibre. The fibre was then oxidised for 5 minutes in oxygen at a temperature of 275°C. The oxidised fibre was subsequently heat treated in an atmosphere of nitrogen to a temperature of 900°C at a heating rate of 50°C/hour and held at 900°C for 2 hours.

The resulting fibre had a diameter of 17 $\mu$m, a tensile strength of $4.8 \times 10^6$ g/cm$^2$, and a Young's modulus of $4.1 \times 10^8$ g/cm$^2$.

EXAMPLE 2

A coal extract was produced as in Example 1, was heated to a temperature of 230°C and was extruded at this temperature and drawn at a draw rate of 100 meters/min. The fibre was then heated in oxygen to a temperature of 190°C at a rate of 1°C/min. The oxidised fibre was subsequently heat treated in an atmosphere of nitrogen to a temperature of 900°C at a rate of 50°C/hour and held at 900°C for 2 hours.

The resulting fibre had a diameter of 37 $\mu$m, a tensile strength of $5.6 \times 10^6$ g/cm$^2$ and a Young's modulus of $4.2 \times 10^8$ g/cm$^2$.

EXAMPLE 3

A coal extract was produced by treating a bright coal of 84% carbon content, calculated on a dry, mineral-matter free, basis, with 3 times its weight of anthracene oil at 400°C under pressure in an inert atmosphere. The coal extract was filtered and excess anthracene oil was distilled off at about 300°C and 10 Torr. to leave a coal extract containing about equal quantities of material derived from the coal extracted and anthracene oil.

The coal extract so prepared was extruded through a 380 $\mu$m die at a temperature of 230°C and drawn at a draw rate of 100 meters/min. to produce a continuous extruded fibre. A tow of about 500 fibres so extruded 10 to 20cm. long were suspended in an oven and kept straight under a tension of about 1 mg./fibre during subsequent processing. The tow of extruded fibres was then oxidised for 5 minutes in oxygen at a temperature of 275°C, and was then heat treated in an atmosphere of nitrogen to a temperature of 900°C at a heating rate of 50°C/hour and held at 900°C for 2 hours, and allowed to cool.

The resulting fibres had diameters of about 17 $\mu$m, tensile strengths of $4.8 \times 10^6$ g/cm$^2$, and a Young's modulus of $4.1 \times 10^8$ g/cm$^2$.

EXAMPLE 4

A tow of extruded fibres, produced as in Example 3, was heated in oxygen to a temperature of 190°C at a rate of 1°C/min. The tow of stabilised fibres was subsequently heat treated in an atmosphere of nitrogen to a temperature of 900°C at a rate of 50°C/hour and held at 900°C for 2 hours, and allowed to cool.

The resulting fibre had a diameter of 37 $\mu$m, a tensile strength of $5.6 \times 10^6$ g/cm$^2$ and Young's modulus of $4.2 \times 10^8$ g/cm$^2$.

EXAMPLE 5

A coal extract produced as in example 3, was extruded through a 380 $\mu$m die, at 250°C and drawn at 450 meters/min. A tow of the extruded fibre, similarly tensioned, was then heated in oxygen to a temperature of 270°C at a heating rate of 1°C/min. The tow of stabilised fibre was subsequently treated in an argon atmosphere at a heating rate of 50°C/hour up to 1000°C and held at 1000°C for 1 hour, and allowed to cool.

The resulting fibres had a diameter of 9.4 $\mu$m, a tensile strength of $10.1 \times 10^6$ g/cm$^2$ and a Young's modulus of $4.7 \times 10^8$ g/cm$^2$.

EXAMPLE 6

A tow of extruded fibres, produced as in example 5, was heated in oxygen from 150° to 270°C at a heating rate of 2.6°C/min. (i.e. an oxidation time of approx. 46 mins.). The tow of stabilised fibre was subsequently heat-treated in an atmosphere of nitrogen from 200°C to a temperature of 1000°C at a rate of 900°C/hour and held at 1000°C for 1 hour (i.e. a total heat-treatment time of less than 2 hours), and then allowed to cool.

The resulting fibre had a diameter of 10.2 $\mu$m, a tensile strength of $11.3 \times 10^6$ g/cm$^2$ and a Young's modulus of $4.7 \times 10^8$ g/cm$^2$.

EXAMPLE 7

A tow of stabilised fibres, produced as in example 6, was heat treated by immersing the tow for 10 minutes in an atmosphere of nitrogen at a temperature of 1000°C.

The resulting fibres had a diameter of 9.8 $\mu$m, a tensile strength of $8.0 \times 10^6$ g/cm$^2$ and a Young's modulus of $4.2 \times 10^8$ g/cm$^2$.

EXAMPLE 8

Carbon fibres as produced in example 3 were washed with acetone. The washed fibres were gently pressed, aligned in the same direction, into a metal mould containing an epoxy-resin system, the mould having previously been coated with a mould release agent. An epoxy-resin system manufactured by CIBA comprising resin MY 750, hardener Hy 906 and accelerator DY 062.

The mould containing epoxy-resin system and fibres was then filled with more resin system and outgassed. A plunger was inserted into the mould, but not depressed, and the whole heated to 100°C for 30 minutes. The plunger was then slowly depressed to predetermined stops to give the required volume loading of fibres. The resin was then cured for a further 2 hours at 100°C and post-cured for 2 hours at 150°C. The mould was then quenched and the composite removed.

Tests carried out on the composite showed that a strong bond was obtained between the carbon fibres and the cured resin matrix. At a 60% volume loading of fibres a flexural strength of $5 \times 10^6$ g/cm$^2$ and a flexural modulus of $2.5 \times 10^8$ g/cm$^2$ were obtained. By "% volume loading" is meant the % of the volume of the mould occupied by the carbon fibre.

EXAMPLE 9

This example is for the purposes of comparison and illustrates the advantages obtained by the use of an extract or solution of coal compared with the use of coal tar pitch or modified coal tar pitch according to the previously proposed methods as hereinbefore described.

A treated pitch was prepared from a medium soft coal tar pitch by heat soaking in an agitated pot at about 400°C. The softening point was 105°C (Ring and Ball). The H/C atomic ratio was 0.585 and the molecular weight, measured by the depression of freezing point of camphor, was about 300. The treated pitch was spun in an analagous manner to that described hereinbefore for extracts or solutions of coal through a 380 $\mu$m die at 124°C. Attempts were made to obtain a fine fibre, but the finest fibre that could be spun had a diameter of 58 $\mu$m. This fibre could not be oxidised.

A vacuum distilled pitch was prepared from the foregoing treated pitch by distilling off the low-boiling components under argon for 1 hour at 360°C, followed by further vacuum distillation at 270°C. The molecular weight, similarly measured, was about 400. The vacuum distilled pitch was spun similarly at 164°C. The finest fibre that could be spun had a diameter of 39 $\mu$m. Attempts were made to stabilise the fibre to heat treatment by oxidation by heating the fibre in an oxygen atmosphere to 230°C at a rate of increase of temperature of 2.6°C/min., and, as an alternative, to 120°C at the same rate of increase, maintaining this temperature for 16 hours. As a further alternative the fibre was heated at 70°C in ozonised oxygen for 3 hours and the temperature was then raised to 260°C at a rate of 1.4°C/min. and held at this value for 1 hour. In each case, the fibre melted on being heated above 300°C in an inert atmosphere.

The vacuum distilled pitch was further treated by mixing 35g with 1g of dicumyl peroxide and heating for 8 hours at 280°C in argon. The molecular weight, similarly measured was about 700. The finest fibre that could be spun, using a spinning temperature of 193°C, had a diameter of 45 $\mu$m. Attempts were made to stabilise the fibre to further heat treatment in an analagous manner to that employed for the vacuum distilled pitch, with no better results.

This contrasts with the use of the solutions or extracts of coal which could be spun under similar conditions to give fibres having diameters of about 10 $\mu$m which could be successfully oxidised to stabilise the fibres to heat treatment whereby the fibres could be carbonised to form fibres consisting essentially of carbon.

We claim:

1. In a process for producing fibers or filaments of carbon comprising melt spinning a carbonaceous material to form a spun fiber or filament, oxidizing the spun fiber or filament of said carbonaceous material at a temperature below that at which is softens and for a length of time necessary to render it infusible thereby stabilizing said fiber or filament and carbonizing the stabilized fiber or filament, the improvements comprising (a) employing as the carbonaceous material a filtered solution or extract of coal, said solution or extract of coal being formed by contacting and dissolving or extracting coal with a solvent boiling at above 200°C. which dissolves or extracts soluble or solubilizable aromatic constituents of coal to form a solution or extract of coal, filtering the solution or extract of coal and concentrating said solution or extract of coal to produce a filtrate containing 40–60% solvent and (b) as the step of oxidizing the spun fiber or filament, oxidizing the spun fiber or filament with air or oxygen at a heating rate of at least about 1°C/min., whereby said fiber or filament is stabilized to further heat treatment, said heat treatment including said step of carbonizing said stabilized fiber or filament.

2. Process as claimed in claim 1 wherein the solvent is a polynuclear aromatic hydrocarbon or a mixture including said polynuclear aromatic hydrocarbons.

3. Process as claimed in claim 1 wherein said step of oxidising said spun or filament of said carbonaceous material is carried out when said fibre, filament is under tension.

4. A process as claimed in claim 3 wherein said step comprising carbonising said stabilised fibre filament is carried out in an inert atmosphere at a temperature from about 800° to about 1200°C.

5. The process of claim 2 wherein said step of oxidizing said spun fiber or filament is carried out when said fiber or filament is under tension.

6. The process of claim 5 wherein said step comprising carbonizing said stabilized fiber or filament is carried out in an inert atmosphere at a temperature of from about 800° to about 1200°C.

* * * * *